UNITED STATES PATENT OFFICE.

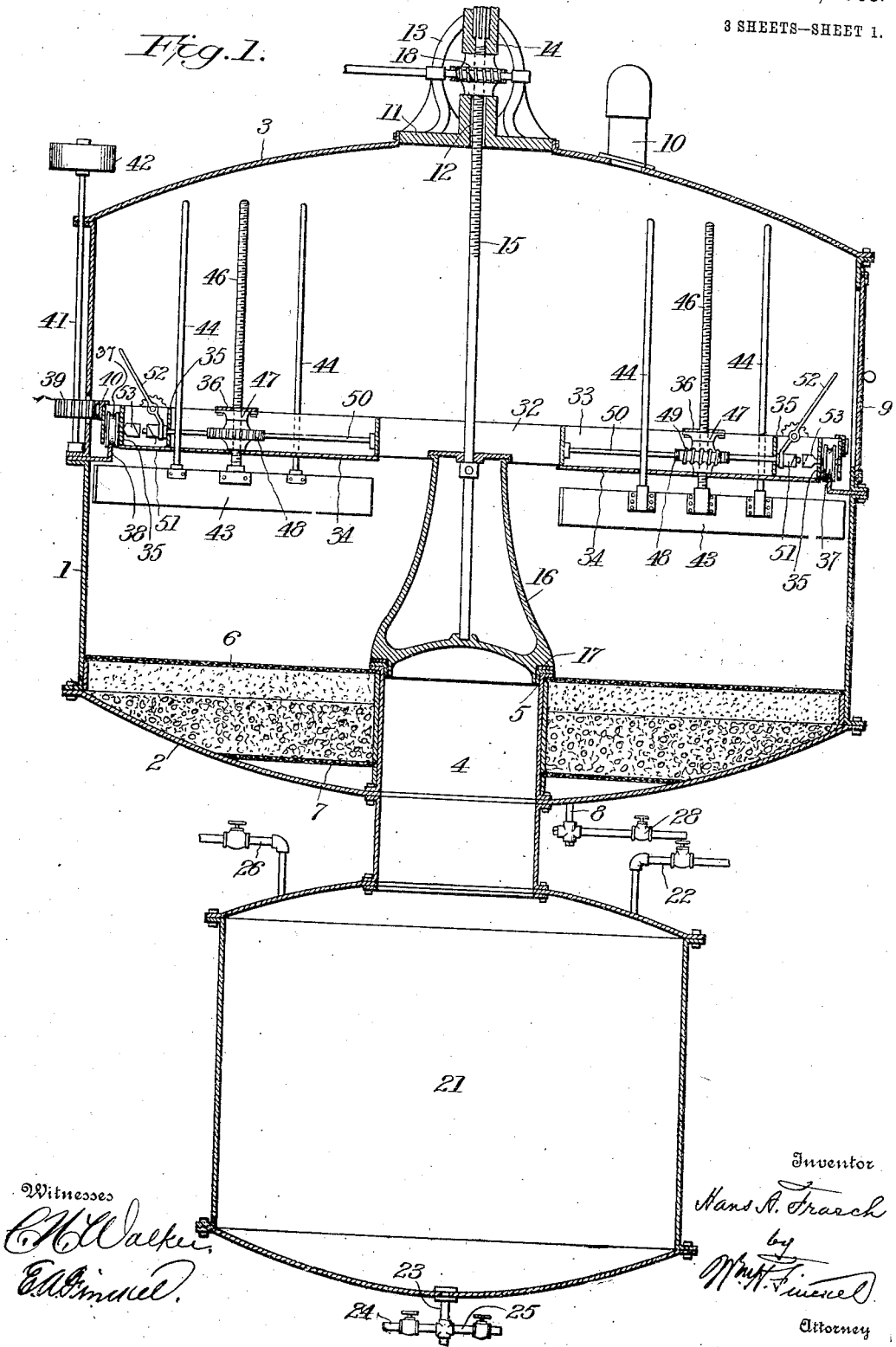

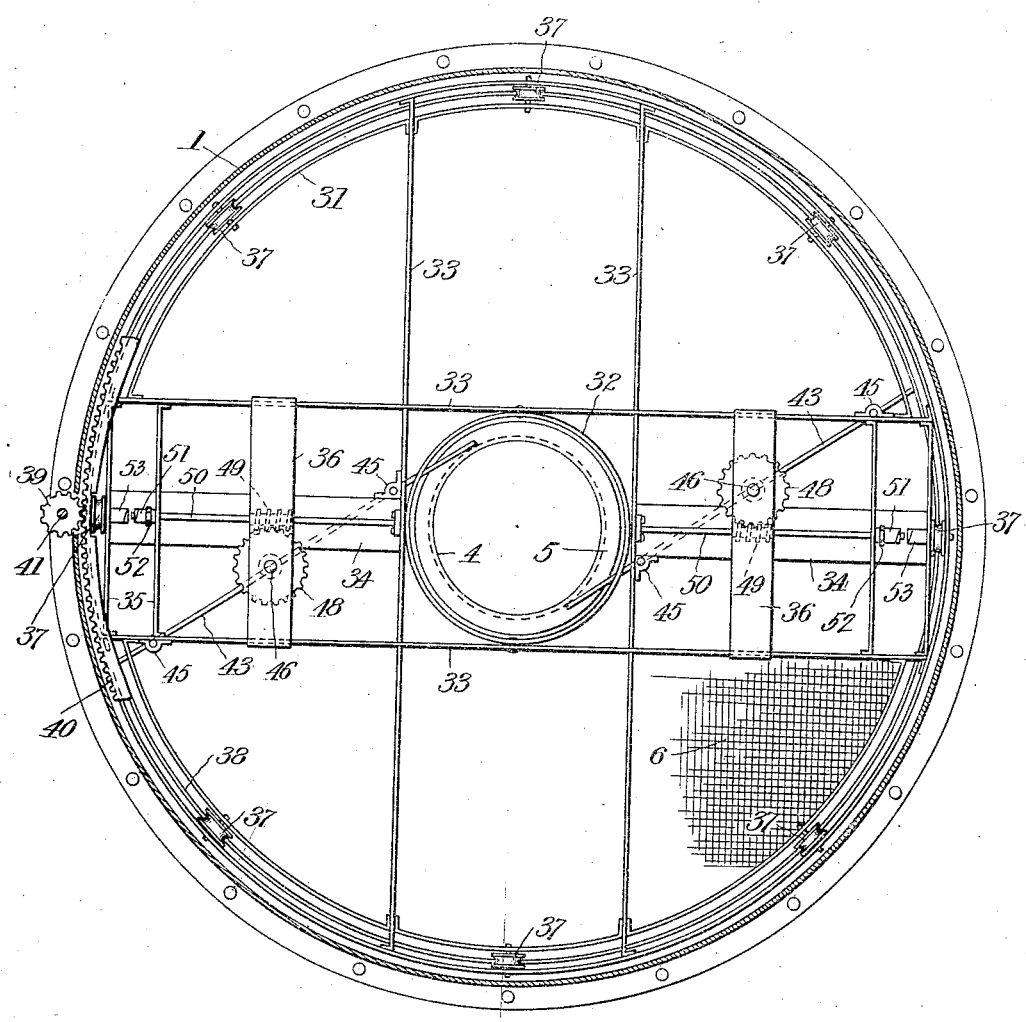

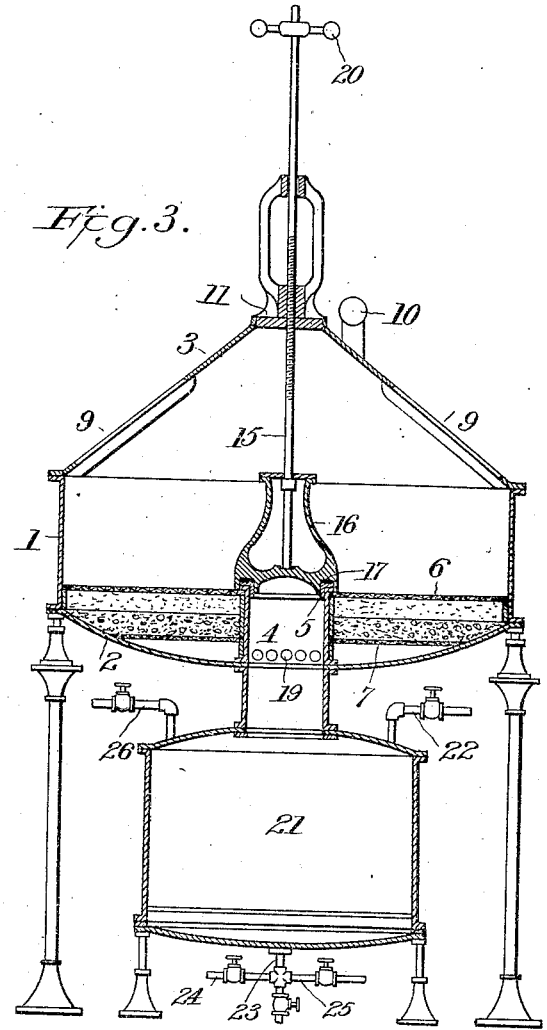
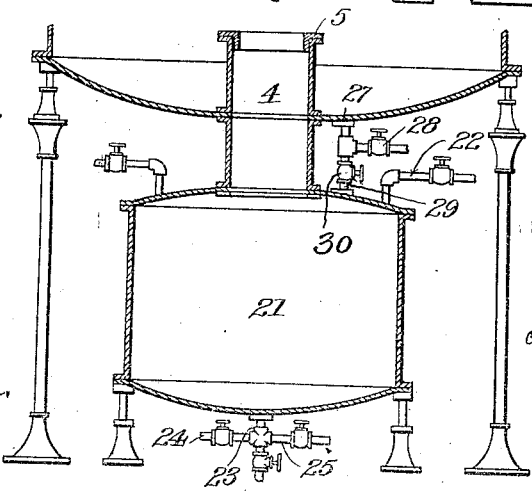

HANS A. FRASCH, OF NEW YORK, N. Y.

FILTER.

No. 903,697.

Specification of Letters Patent.

Patented Nov. 10, 1908.

Application filed March 18, 1908. Serial No. 421,831.

*To all whom it may concern:*

Be it known that I, HANS A. FRASCH, a citizen of the United States, residing at New York, in the county of New York and State of New York, have invented a certain new and useful Improvement in Filters, of which the following is a full, clear, and exact description.

The object of the invention is to provide a filtering apparatus for use in manufacturing chemicals and other substances with means whereby the filtered substances may be removed quickly and economically.

The invention has reference particularly to the recovery of solid substances from fluids, and more especially to the economical handling of nickel ammonium chlorid separated from caustic liquor.

In the manufacture of nickel salts by the reaction of nickel hydrate upon ammoniated salt brine, and the subsequent mixing of the nickel salt with ammonium chlorid and calcium chlorid solution prior to subjecting it to distillation for the recovery of the ammonia and nickel hydrate, and the separation and removal of the nickel hydrate from the still liquor in which it is suspended, and the subsequent mixing of the nickel hydrate with fresh ammoniated salt brine, the presence of ammonia renders the handling and mixing of the nickel salt and nickel hydrate noxious and involves a possibility of loss of ammonia.

The present invention is designed to render this process innoxious and free from loss of ammonia.

The application of the invention to filtering apparatus generally, besides for the specific purpose stated, offers the advantage of employing filters of much larger size than otherwise would be practicable, and in addition it admits of the quick emptying of the filter in much less time, and, hence, renders the filter more quickly available for service again than heretofore.

In the accompanying drawings, illustrating the invention, in the several figures of which like parts are similarly designated, Figure 1 is a vertical section, illustrating one form of the invention. Fig. 2 is a plan view. Fig. 3 is a vertical section and partial elevation of a modification. Fig. 4 is a vertical section of a portion of another modification.

The filter body is composed of a cylinder 1, made up of one or more rings, having edge flanges to which are respectively secured the concave bottom 2 and the complemental top 3. In this concave bottom is mounted a discharge pipe 4, preferably centrally thereof, and this pipe may be of any desired cross-sectional shape, and because of its purpose and function it is herein referred to as a conduit or discharge conduit. This conduit projects outside of the bottom and extends up into the cylindrical portion of the filter and is provided with a valve seat 5 at its top.

6 is a screen of any suitable sort, suitably supported within the cylindrical portion of the filter and surrounding the discharge conduit 4, and below this screen and in the concave bottom is another screen 7 also suitably supported and surrounding the conduit 4, and between these two screens is arranged any suitable filtering medium, such as sand or gravel, or a mixture of these, or any other filtering materials suitable for the purpose in hand, the whole constituting a filter-bed. Thus, the conduit 4 extends through the filter-bed and is surrounded by it.

8 is a suction pipe secured in the bottom and connected to a receiver and vacuum pump or other suitable apparatus. Suitable work openings 9 are provided for access to the interior.

10 is a ventilator connected with an exhaust fan or other apparatus by which the noxious fumes are removed and the ammonia escaping from the filtering substance is collected and conveyed to a scrubber to be absorbed in salt brine or water. On the top 3 is a suitable casting 11, provided with a threadless opening 12 and a yoke 13 having a guide 14.

15 is a screwthreaded valve stem arranged in opening 12 and held in guide 14 against turning.

16 is a valve swiveled to stem 15 and having in its face any suitable gasket or packing 17 to fit the seat 5 of the conduit 4 to open and close said conduit. This stem may be power-actuated by means of worm-geared nut 18.

Describing this apparatus as used for the purpose of separating nickel ammonium chlorid from caustic soda liquor, and effectually mixing the former with calcium chlorid solution, the valve 16 is turned down to close the conduit 4, and then the mixture of caustic soda liquor and nickel salt coming from a converter or other source, is delivered into the body of the filter 1, and the air in the filter bottom is exhausted through pipe 8. When all of the caustic soda liquor has been drained from the nickel salt, the valve is raised so as to open the conduit 4, after which the nickel salt is removed from the body of the filter by any suitable means, mechanical or manual.

In the modification shown in Fig. 3, pipe 8 is omitted, and the conduit 4 is shown with a row of perforations 19 at its base within the bottom of the filter, and the valve stem 15 is supplied with a hand wheel 20 for operating the valve, or said valve may be power operated as in the former instance. The conduit 4 opens into a receiving and suction tank 21 which is supplied with a suction pipe 22 connected with any suitable vacuum or other pump, and it is also supplied at its bottom with a liquid or filtrate outlet pipe 23, having an air-inlet 24 for agitating purposes, and a discharge pipe 25 for the filtered substance after it has been mixed with the liquid vehicle. This suction tank also has at its top a delivery pipe 26 for introducing the desired liquid to be mixed with the filtered solid substance. In using this form of the apparatus, the valve is closed, as before, and the substance to be filtered is introduced and the air is exhausted through pipe 22. The caustic soda liquor passes through the filter-bed and out through the holes 19 in the conduit 4 to the tank 21, the nickel salt collecting in the body of the filter on the upper screen, or top of the filter-bed, as before. When all of the caustic soda liquor has been drained from the nickel salt, the filtrate having been previously removed from the receiver 21 through pipe 23, the valve 16 is opened and the nickel salt is then removed from the body of the filter by any suitable means and discharged through the conduit 4 into the tank 21, where it is mixed with a suitable vehicle for further treatment. When the material in the tank 21 is properly mixed, it is discharged through pipe 25 to any desired station for any necessary further treatment. The filtered substance may be conveyed away from the filter through the conduit 4 to any suitable vessel, such as a tank, conveyer, furnace, or other receptacle and this vessel may be of a character appropriate to the substance to be treated. For example, if the filter is employed for sodium bicarbonate, the filtered substance may be delivered through the conduit 4 directly to a drying or calcining device. In the case of nickel hydrate filtered from still liquor, the hydrate may be delivered directly to a converter to be mixed with ammoniated salt brine, and the filter may be mounted upon the converter by means of the flanges at the outside end of the conduit 4.

Referring to the modification shown in Fig. 4, the discharge conduit is shown as fixed to the tank 21, as in the modification shown in Fig. 3, but instead of having the openings as at 19 in Fig. 3, this conduit may be made solid as in the construction shown in Fig. 1, and the necessary connection between the bottom of the filter cylinder and the tank 21 may be effected by a pipe 27 having a valve 28 as a filtrate outlet and also having a branch pipe 29 having a valve 30 which may also be used as a filtrate outlet.

The filter may be emptied of its filtered substance through the discharge conduit by hand, and with any usual hand tools operated by way of the work openings in the side or top, but as shown in Figs. 1 and 2, I prefer to provide mechanical means for economically and quickly emptying the filter. In either case, whether hand tools be used or the mechanical means, the filter may be quickly emptied and thereby be returned to service in a very much shorter time than by the old methods in which a relatively large discharge conduit is not used. Moreover, by means of the present invention, as already stated, filters of larger area and consequently of greater capacity than those heretofore practicable may be employed.

The mechanical discharge shown in Figs. 1 and 2, comprises an annular frame having the concentric rim 31 and center-piece 32, connected by a series of cross-pieces 33, and cross-piece braces 34, 35 and 36. The rim 31 is provided with a series of wheels 37, which ride upon a track 38 which may be of angle-iron bolted in the joint between the sections 1 of the cylindrical portions of the filter, and this frame is adapted to be rotated upon this track, as by means of a pinion 39 meshing in a toothed rack 40 fixed to the rim. The pinion 39, as shown, is mounted upon a vertical shaft 41 which is supplied with a pulley 42 connected up to any suitable source of power. Any suitable number of scraper blades 43 may be mounted upon this frame, and they are preferably mounted obliquely to the frame, or tangentially to the discharge conduit 4, and they are held and guided in the frame by means of guide rods 44 mounted in suitable guide-sockets 45, and each of these blades has a screw-rod 46 passing through a guide-socket 47 on the frame, and each screw-rod has a worm-wheel nut 48 in mesh with a worm 49 on the shaft 50. The worm-wheel nut is placed between braces 36, and while permitted to rotate it does not move lengthwise of the screw-rod, but does move said screw-rod lengthwise. Each shaft 50 has a clutch member 51 and in connection with this clutch member is a clutch lever 52 accessible through a work opening 9 in the side of the cylinder. Opposite each shaft 50 is one of the wheels 37, and the shaft of this wheel has the other clutch member 53 to coöperate with the clutch member 51, and, consequently, when the clutch members are in engagement the shaft 50 is turned and the worm-wheel nut turned and acts upon the screw-rod 46 to depress the scraper blade automatically and proportionately to the displacement of the filtered substance. Since the blades are arranged at an angle, it follows that the displaced material will be forced by them into the conduit 4 and so be discharged. The mechanical scraper may be applied also to the modification shown in Figs. 3 and 4.

In the construction shown in Fig. 4, the presence of the valves 28 and 30 renders tank 21 capable of a variety of uses, both on the filtered substance and in connection with the filtrate. Further, it is to be noted that the valve stem in Fig. 3 is a rotary stem, its screwthread engaging a screwthread in the casting 11 to effect its longitudinal movement, while in Fig. 1 the valve stem does not rotate, but is held against rotation by some sort of angular engagement with the guide 14, and its longitudinal movement is effected by the feed of the nut 18. These and other modifications of the main construction, namely, a filter having a bottom outlet for the filtered substance, are within the spirit and scope of the invention.

What I claim is:—

1. A filter, having a filter bed, and a discharge conduit extending from the top of the filter bed entirely through said filter bed, terminating in a discharge opening at the bottom of the filter and forming a direct communication between the top of the filter bed and a suitable receptacle under the filter, through which the filtered substance may be discharged in compact form.

2. A filter, having a filter bed, and a discharge conduit extending from the top of the filter bed entirely through said filter bed, terminating in a discharge opening at the bottom of the filter, and forming a direct communication between the top of the filter bed and a suitable receptacle under the filter, through which the filtered substance may be discharged in compact form, and means for discharging the filtered substance from the top of the filter bed through said discharge conduit.

3. A filter, having a filter-bed, a discharge conduit extending from the top of the filter-bed entirely through it, means to open and close said discharge conduit, and a rotary scraper arranged above the filter-bed and serving to discharge the filtered substance through the discharge conduit.

4. A filter, having a filter bed, and a discharge conduit extending from the top of the filter bed entirely through said filter bed, terminating in a discharge opening at the bottom of the filter, and forming a direct communication between the top of the filter bed and a suitable receptacle under the filter, through which the filtered substance may be discharged in compact form, and means to draw off the liquid from the solid substance and thereby leave the solid substance on the filter bed to be discharged through said conduit.

5. A filter, having a filter bed, a screen overlying the said filter bed, a discharge conduit connected with the surface of the screen and extending through the body of the filter bed and terminating in a discharge opening at the bottom of the filter, and forming a direct communication between the surface of the screen and a suitable receptacle under the filter, and through which the filtered substance may be discharged in compact form.

6. A filter, having in its bottom a discharge conduit, a filter-bed surrounding said conduit and through which said conduit projects, a valve fitted over the conduit to open and close said conduit, means to draw off the fluid from the solid and thereby leave the solid on the filter-bed to be removed through the conduit, and means to discharge the filtered substance through the said conduit.

7. A filter, having in its bottom a discharge conduit, a filter-bed surrounding said conduit and through which said conduit projects, a valve fitted to open and close said conduit, and means to exhaust the air from below the filter-bed and to remove the fluid while retaining the solid portion of the substance treated, such solid portion being removable from the filter through the conduit upon the opening of the valve.

8. A filter, having a filter-bed, a receiving vessel upon which it is mounted, means for controlling communication between the filter and the receiving vessel, including a discharge conduit projecting up through the filter-bed into the filter, and a valve for controlling the opening and closing of said conduit.

9. A filter, having a filter-bed, a discharge conduit extending through said filter-bed, a scraper arranged within the filter and above the filter-bed, and means to rotate said scraper over the said bed and thereby detach the filtered substance and convey it to and discharge it through the conduit.

10. A filter, having a filter-bed, a discharge conduit extending through said bed, and means to dislodge the filtered substance from the surface of the filter-bed and convey it to and discharge it through said conduit, and comprising a rotary frame and scraper blades adjustably mounted thereon.

11. A filter, having a filter bed, a discharge conduit extending through said bed, and means to discharge the filtered substance from the bed through the conduit and comprising a frame, means to rotate said frame, scraper blades mounted in said frame, and means to adjust said blades automatically to regulate the amount of filtered substance to be discharged.

12. A filter, having a filter-bed, a discharge conduit extending through said bed, and means to dislodge the filtered substance from the surface of the filter-bed and convey it to and discharge it through said conduit, and comprising a rotary frame and scraper blades adjustably mounted thereon, said frame having wheels running upon a track and connections between any of said wheels and the scraper blades constituting means to automatically adjust said blades.

13. A filter, having a filter-bed, a discharge conduit extending through said bed, and means to dislodge the filtered substance from the surface of the filter-bed and convey it to and discharge it through said conduit, and comprising a rotary frame and scraper blades adjustably mounted thereon, a track to support the frame, said frame having wheels mounted upon the track, worm-gearing applied to the adjusting mechanism of the scraper blades, and a driving connection applied between any of said wheels and the worm-gearing.

In testimony whereof I have hereunto set my hand this 12th day of March A. D. 1908.

HANS A. FRASCH.

Witnesses:
WM. H. FINCKEL,
PHILIP F. LARNER.